Sept. 20, 1927.  
W. F. TRAVES  
1,642,832  
PIPE GRIPPING AND SUPPORTING DEVICE  
Filed Aug. 30, 1926  
2 Sheets-Sheet 1

INVENTOR.  
W. F. Traves  
BY  
ATTORNEYS.

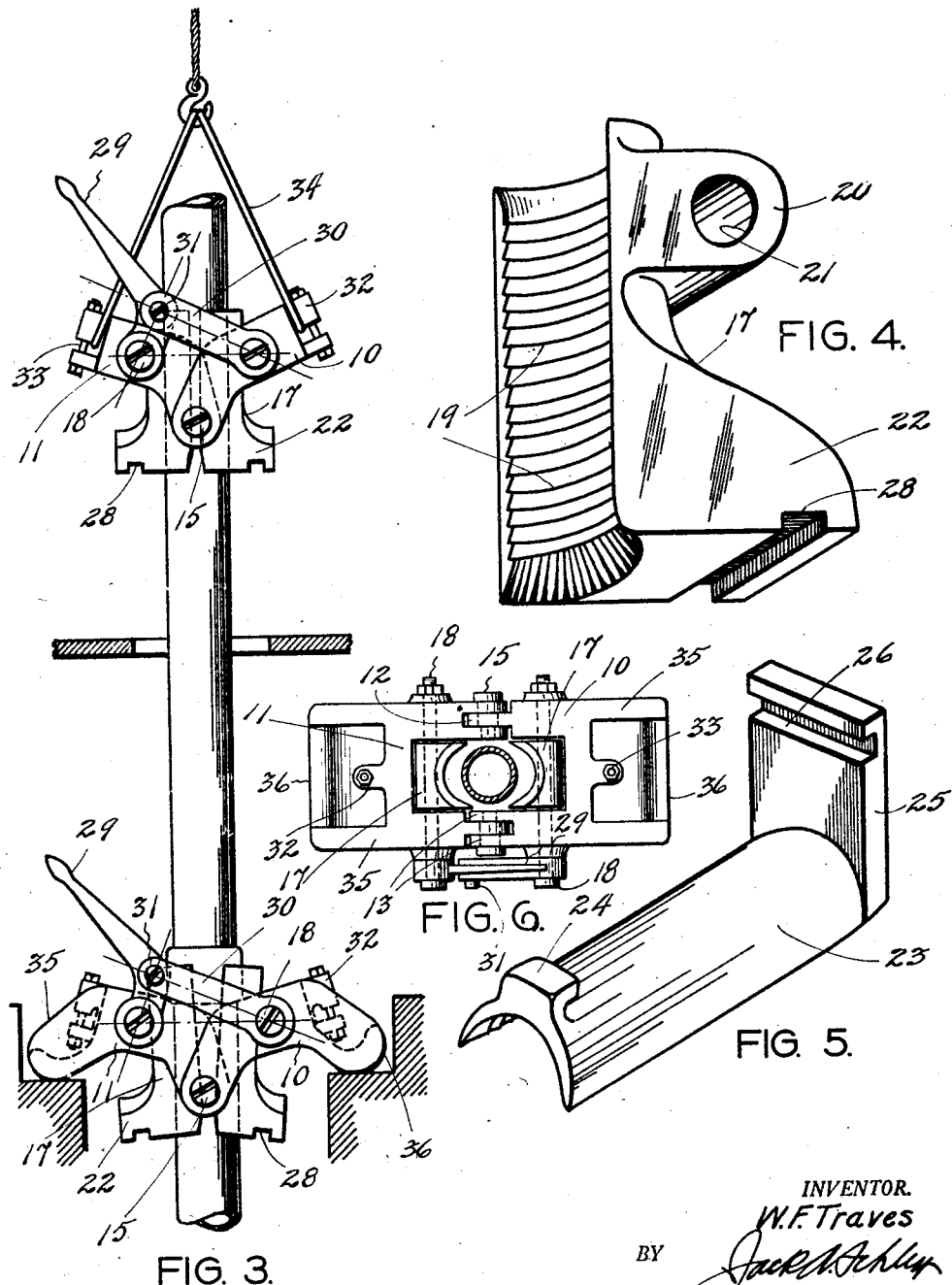

Patented Sept. 20, 1927.

1,642,832

UNITED STATES PATENT OFFICE.

WEBSTER F. TRAVES, OF OKLAHOMA CITY, OKLAHOMA, ASSIGNOR TO THE GUIBERSON CORPORATION, OF DALLAS, TEXAS, A CORPORATION OF DELAWARE.

PIPE GRIPPING AND SUPPORTING DEVICE.

Application filed August 30, 1926. Serial No. 132,428.

This invention relates to new and useful improvements in pipe gripping and supporting devices.

The object of the invention is to provide a device of the character described in which the gripping members are so arranged as to free the pipe and collars as the pipe is pulled upward therethrough, but to automatically grip and support the pipe if the latter is dropped or moved downwardly while being lifted.

Another object of the invention is to provide a gripping and supporting device in which the gripping members are counterbalanced and pivotally suspended, as well as being mounted to swing bodily toward and from the pipe, thus tending to hang parallel to the pipe and presenting maximum gripping surfaces and also to oscillate and grip the collar as well as the pipe, thereby being self-adjusting.

A particular object of the invention is that while the device may be fastened in an open position to permit the pipe and collars to be lowered therethrough, it cannot be fastened in gripping position.

A still further object of the invention is to provide a device of the knuckle-joint type comprising simple parts with an easy opening means.

A construction designed to carry out the invention will be hereinafter described, together with other features of the invention.

Figure 1:
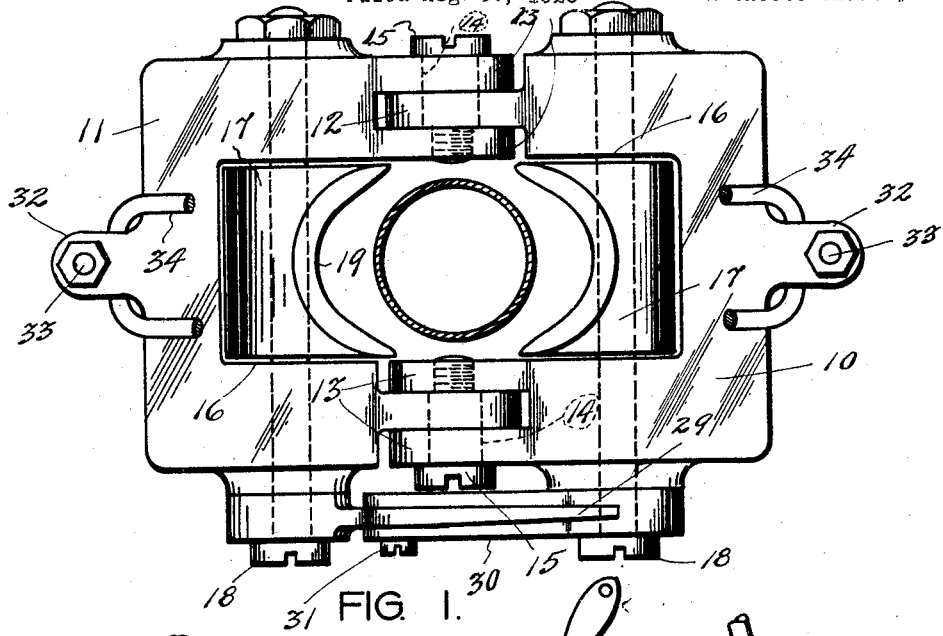
Figure 2:
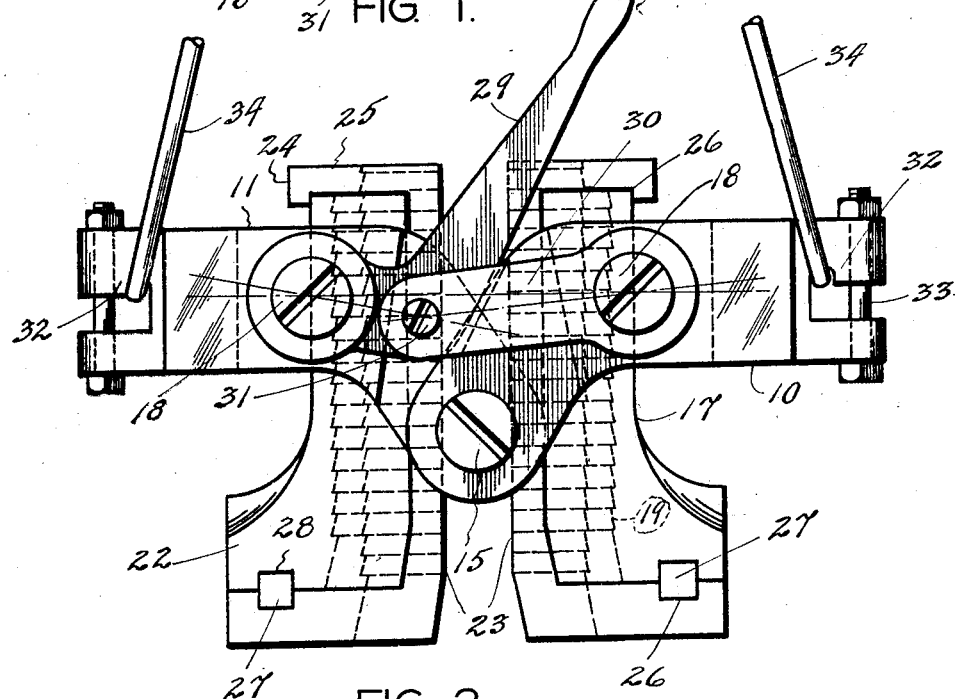

The invention will be more readily understood from a reading of the following specification and by reference to the accompanying drawings, in which an example of the invention is shown and wherein:

Fig. 1 is a plan view of an elevator constructed in accordance with my invention, Fig. 2 is a side elevation of the same, Fig. 3 is a view showing the elevator applied to a pipe and also showing in side elevation a spider constructed in accordance with the invention and gripping said pipe, Fig. 4 is a perspective view of one of the gripping members, Fig. 5 is a perspective view of a liner used on the gripping member for smaller pipe, and Fig. 6 is a plan view of the spider shown in Fig. 3.

It is to be understood that my invention may be embodied either in an elevator, a spider or any other form of pipe gripping and supporting device for which it is suitable.

In constructing the elevator, I employ a pair of yokes 10 and 11 respectively. Each yoke has at one side a single lug 12 and at the other side a pair of spaced ears 13. The lugs and ears are arranged on opposite sides so that the lug of one yoke will enter between the ears of the other yoke at the transverse center of the device. The lugs are pivoted on shouldered pins 14, which are screwed into the inner ears and are provided with heads 15 whereby they may be removed.

The yokes, when pivoted together, constitute supporting elements connected by knuckle-joints. By observing Fig. 2, it will be seen that the ears and lugs are directed downwardly from the ends of the yokes and the pivot pins are thus below the plane of the yokes.

Each yoke has a U-shaped recess or socket 16 in which a gripping member 17 is pivoted on a transverse bolt 18. Each gripping member comprises a toothed concaved face 19 for gripping the pipe and collars. A transverse boss 20 extends across the back of each gripping member near its upper end and is provided with a smooth longitudinal bore 21, through which the bolt 18 passes. The bore is offset from the face 19 and is considerably above the center of the member, therefore, in order to counter-balance the member and cause it to hang with its face 19 parallel to the pipe, an enlargement 22 is formed at the bottom of the member, as is best shown in Figs. 2 and 4. By this arrangement the gripping members will hang substantially perpendicular, irrespective of the position to which the yokes are swung.

Where it is desired to grip pipes of smaller diameters, a concavo-convex liner 23 is seated against the face 19 of each gripping member. Each liner has a hook 24 at its upper end (Fig. 5) for engaging over the reduced upper end of said member. A clamp plate 25 at the bottom of the liner extends under the flat bottom of the member and has an angular recess 26 for receiving a locking key 27 which engages in a similar recess 28 in the member 17. To remove the liners, it is merely necessary to drive out the keys and slip off said liners.

For swinging the yokes to a horizontal plane, for the purpose of spreading the gripping members apart and thus opening the device, I fulcrum a bell-crank hand lever 29 on one of the bolts 18. On the other bolt 18, I pivot one end of a link 30, while the opposite end is pivoted to the lever by a pin 31 at the inter-section of the angular portions of the latter.

It will be seen that when this lever is swung in a clockwise direction, the yokes will be raised to a substantially horizontal position and the members 17 will thus be spread apart. When this position is reached, the pin 31 will be below the centers of the bolts 18, whereby the parts will be so held until the lever is again swung. When the lever is swung in a counter-clockwise direction, the yokes will be rocked on their fulcrums and thus swung downward, whereby the gripping members will be adjusted toward each other so as to grip the pipe.

Where the device is used as an elevator, I provide the outer central portion of each yoke with a hook 32 and a keeper bolt 33 for receiving and retaining the elevator links 34. Where the device is constructed as a spider, transverse fulcrum bosses 35 are formed on the outer ends of each yoke and extend outwardly and downwardly similarly to the lugs and ears. Each boss 35 has a rounded face 36 on which it is fulcrumed.

It will be seen that the action will be substantially the same whether the yokes are fulcrumed on the links 34 or on the bosses 35. When the lever 29 is swung to the position shown in Fig. 3, the yokes are supported on their fulcrums and the gripping members 15 are free to grip the pipe. When the pipe is moved upwardly, the teeth 19 will not bite into the pipe, because owing to the knuckle-joints between the yokes and the fulcrumed supports both the gripping members and the yokes will move upwardly, thus offering no resistance to the upwardly moving pipe. In this connection, it is pointed out that the pipe collars will readily pass through the gripping members and owing to the pivoted mounting of said members, they will grip the collar and the pipe at the same time when the pipe is moved downwardly. It will be seen that should the pipe be dropped that the fulcrumed yokes and pivoted gripping members will be carried downwardly and toward each other by the pipe, thus automatically gripping the same.

The fulcrumed yokes and pivoted gripping members enable easy and quick handling of the device and permit the pulling of pipe under safe conditions, because the pipe will be automatically gripped if dropped, yet no resistance is offered to the pulley. Also where the spider is mounted in the cellar, a suitable rope (not shown) may be attached to the lever 29 and the same thus manipulated from the derrick floor. The counter-balanced gripping members will always present the teeth of the faces 19 in maximum gripping relation to the pipe and will adjust themselves after a collar passes there-between, or will grip said collar efficiently. By removing the pins 15 and 31, the yokes may be quickly separated and removed or applied to a pipe.

Various changes in the size and shape of the different parts, as well as modifications and alterations, may be made within the scope of the appended claims.

What I claim, is:

1. In a pipe gripping and supporting device, a pair of supporting elements hinged together at their inner ends and having rounded fulcrums at their outer ends free for engagement with a flat supporting surface, the supporting elements being recessed at their inner ends, and opposed gripping members pivotally mounted on said supporting elements and disposed in the recesses thereof.

2. In a pipe gripping and supporting device, a pair of supporting elements hinged together at their inner ends and having rounded fulcrums at their outer ends free for engagement with a flat supporting surface, the supporting elements being recessed at their inner ends, opposed gripping members pivotally mounted on said supporting elements and disposed in the recesses thereof, and means for swinging said supporting elements to relatively open and close the gripping members.

3. In a pipe gripping and supporting device, a pair of jointed elements having unattached supporting fulcrums upon which they are mounted, a pair of gripping members pivoted within said elements and having vertical gripping faces, and a lever connected with the supporting elements for swinging the same in their fulcrums to spread or contract the gripping members.

4. In a pipe gripping and supporting device, a pair of horizontally disposed supporting elements mounted to rock in vertical arcs and joined together, said elements having free fulcrums, and a pair of pipe gripping members pivotally suspended by said elements, and having gripping faces for gripping a pipe and its collars said members being mounted to yield to an upward movement of the pipe and to automatically grip the pipe upon a downward movement of the same.

5. In a pipe gripping and supporting device, a pair of horizontally disposed supporting elements mounted to rock in vertical arcs and joined together, said elements having free fulcrums, a pair of pipe gripping members pivotally suspended by said elements and having gripping faces for gripping a pipe and its collars, said members being mounted to yield to an upward movement of the pipe and to automatically grip the pipe upon a downward movement of the same, and means connected with the supporting elements for rocking the same to a predetermined position and fastening them at such position, whereby the gripping members are held out of gripping relation to the pipe and its collars.

6. In a pipe gripping and supporting device, a pair of jointed yokes having their outer ends free and forming fulcrums, whereby they are supported for swinging in vertical arcs, and a pair of gripping members pivoted in the yokes and automatically swinging said yokes when moved either upwardly or downwardly.

7. In a pipe gripping and supporting device, a pair of jointed yokes having their outer ends free and forming fulcrums, whereby they are supported for swinging in vertical arcs, a pair of gripping members pivoted in the yokes and automatically swinging said yokes when moved either upwardly or downwardly, and means for fastening said yokes against swinging by said gripping members.

8. In a pipe gripping and supporting device, a pair of supporting yokes having free fulcrums at their outer ends and hinged together at their inner ends, and gripping members pivotally suspended in the yokes and having opposed vertical gripping faces.

9. In a pipe gripping and supporting device, a pair of supporting yokes having free fulcrums at their outer ends and hinged together at their inner ends, and gripping members pivotally suspended in the yokes and having opposed vertical gripping faces, said gripping members being counter-balanced, whereby their vertical gripping faces are self-adjusting to a pipe and its collars and are presented substantially parallel to the pipe.

10. As a sub-combination in a pipe gripping and supporting device, a gripping member having a pivotal supporting element above its center and a counter-balancing enlargement below its center.

11. As a sub-combination in a pipe gripping and supporting device, a gripping member having a pivotal supporting element above its center and a counter-balancing enlargement below its center, a liner having a gripping face end engaged with the upper end of the member and having a clamp plate extending under the member, and a key for fastening the liner to the member.

12. In a pipe gripping and supporting device, a pair of supporting yokes hinged together at their inner ends and having free fulcrum supports at their outer ends, pivot bolts mounted transversely in the yokes, and gripping members within the yokes suspended on said bolts and having vertical gripping faces.

13. In a pipe gripping and supporting device, a pair of supporting yokes hinged together at their inner ends and having free fulcrum supports at their outer ends, pivot bolts mounted transversely in the yokes, gripping members within the yokes suspended on said bolts and having vertical gripping faces, and elevator hooks on said yokes outwardly of the bolts.

14. In a pipe gripping and supporting device a pair of supporting yokes hinged together at their inner ends and having fulcrum supports at their outer ends, pivot bolts mounted transversely in the yokes, gripping members within the yokes suspended on said bolts and having vertical gripping faces, elevator hooks on said yokes outwardly of the bolts, a link connected to one of the bolts, and a hand lever connected to the other bolt and pivoted to the lever 15. In a pipe gripping and supporting device, a pair of yokes having free fulcrums at their outer ends and sockets at their inner ends, down-turned lugs and ears on the inner ends of the yokes on each side of the sockets of the yokes, pins pivotally connecting said lugs and ears, transverse bolts mounted in the yokes and extending across the sockets thereof, and gripping members pivoted on said bolts in the sockets of the yokes and having vertical gripping faces.

16. In a pipe gripping and supporting device, a pair of yokes having free fulcrums at their outer ends and sockets at their inner ends, down-turned lugs and ears on the inner ends of the yokes on each side of the sockets of the yokes, pins pivotally connecting said lugs and ears, transverse bolts mounted in the yokes and extending across the sockets thereof, and gripping members pivoted on said bolts in the sockets of the yokes and having vertical gripping faces, the said gripping members having counter-balancing portions below said bolts, whereby their faces are held perpendicular to the pipe and said members are self-adjusting.

17. In a pipe gripping and supporting device, a pair of yokes having fulcrums at their outer ends and sockets at their inner ends, down-turned lugs and ears on the inner ends of the yokes on each side of the sockets of the yokes, pins pivotally connecting said lugs and ears, transverse bolts mounted in the yokes and extending across the sockets thereof, gripping members pivoted on said bolts in the sockets of the yokes and having vertical gripping faces, the said gripping members having counter-balancing portions below said bolts, whereby their faces are held perpendicular to the pipe and said members are self-adjusting, a bell crank lever pivoted on one of the bolts, and a link pivoted on the other bolt and also pivoted to the lever.

In testimony whereof I affix my signature.

WEBSTER F. TRAVES.